US011853852B2

(12) United States Patent
Price et al.

(10) Patent No.: US 11,853,852 B2
(45) Date of Patent: Dec. 26, 2023

(54) SYSTEMS AND METHODS FOR PREVENTING MACHINE LEARNING MODELS FROM NEGATIVELY AFFECTING MOBILE DEVICES THROUGH INTERMITTENT THROTTLING (71) Applicant: Capital One Services, LLC, McLean, VA (US)

(72) Inventors: Micah Price, Plano, TX (US); Sunil Subrahmanyam Vasisht, Flowermound, TX (US); Stephen Michael Wylie, Carrollton, TX (US); Geoffrey Dagley, McKinney, TX (US); Qiaochu Tang, The Colony, TX (US); Jason Richard Hoover, Grapevine, TX (US)

(73) Assignee: Capital One Services, LLC, McLean, VA (US)

(*) Notice: Subject to any disclaimer, the term of this patent is extended or adjusted under 35 U.S.C. 154(b) by 740 days.

(21) Appl. No.: 16/662,660

(22) Filed: Oct. 24, 2019

(65) Prior Publication Data
US 2020/0057962 A1 Feb. 20, 2020

Related U.S. Application Data (63) Continuation of application No. 15/913,151, filed on Mar. 6, 2018, now Pat. No. 11,367,015, which is a (Continued)

(51) Int. Cl.
G06N 20/00 (2019.01)
G06F 1/3212 (2019.01)
(Continued)

(52) U.S. Cl.
CPC ............ *G06N 20/00* (2019.01); *G06F 1/206* (2013.01); *G06F 1/3212* (2013.01); *G06F 9/541* (2013.01);
(Continued)

(58) Field of Classification Search
CPC ....... G06N 20/00; G06F 1/206; G06F 1/3212; G06F 9/541; H04W 52/0209; H04W 52/0251; H04N 5/23218
See application file for complete search history.

(56) References Cited

U.S. PATENT DOCUMENTS

7,770,176 B2    8/2010  Maeda et al.
8,560,229 B1 * 10/2013  Park .................... G01C 21/20
                                                                701/516
(Continued)

*Primary Examiner* — Ryan C Vaughn
(74) *Attorney, Agent, or Firm* — Finnegan, Henderson, Farabow, Garrett & Dunner, LLP (57) ABSTRACT Systems and methods for preventing machine learning models from negatively affecting mobile devices are provided. For example, a mobile device including a camera, memory devices, and one or more processors are provided. In some embodiments, the processors may be configured to provide images captured by the camera to a machine learning model at a first rate. The processors may also be configured to determine whether one or more of the images includes an object. If one or more of the images includes the object, the processors may be further configured to adjust the first rate of providing the images to the machine learning model to a second rate, and in some embodiments, determine whether to adjust the second rate of providing the images to the machine learning model to a third rate based on output received from the machine learning model.

20 Claims, 4 Drawing Sheets

Related U.S. Application Data continuation of application No. 15/912,239, filed on Mar. 5, 2018, now Pat. No. 10,496,936.

(51) Int. Cl.
*H04W 52/02* (2009.01)
*H04N 23/61* (2023.01)
*G06F 9/54* (2006.01)
*G06F 1/20* (2006.01)

(52) U.S. Cl.
CPC ........ *H04N 23/61* (2023.01); *H04W 52/0209* (2013.01); *H04W 52/0251* (2013.01)

(56) References Cited

U.S. PATENT DOCUMENTS

| | | |
|---|---|---|
| 8,732,487 B2 | 5/2014 | Goraczko et al. |
| 8,910,508 B2 | 12/2014 | Liwa |
| 9,147,128 B1 * | 9/2015 | Chafni ................... G06V 40/50 |
| 9,171,380 B2 * | 10/2015 | Lee ................... H04N 5/23219 |
| 9,488,533 B2 | 11/2016 | Schnetker |
| 10,552,750 B1 * | 2/2020 | Raghavan .......... G06Q 30/0639 |
| 2005/0125390 A1 | 6/2005 | Hurst-Hiller et al. |
| 2013/0057571 A1 | 3/2013 | Harris |
| 2014/0292564 A1 * | 10/2014 | Park ........................ G01S 19/14 |
| | | 342/357.2 |
| 2015/0277971 A1 | 10/2015 | Young, III et al. |
| 2016/0171390 A1 | 6/2016 | Mirzaei et al. |
| 2018/0225993 A1 | 8/2018 | Buras et al. |

* cited by examiner

SYSTEMS AND METHODS FOR PREVENTING MACHINE LEARNING MODELS FROM NEGATIVELY AFFECTING MOBILE DEVICES THROUGH INTERMITTENT THROTTLING

CROSS-REFERENCE TO RELATED APPLICATIONS

This application is a continuation of U.S. application Ser. No. 15/913,151, filed Mar. 6, 2018 (currently pending), which is a continuation of U.S. patent application Ser. No. 15/912,239, filed Mar. 5, 2018. The contents of each of the above-referenced applications are hereby incorporated in their entireties.

TECHNICAL FIELD

The disclosed embodiments generally relate to machine learning and resource management on mobile devices. Some embodiments are drawn to preventing machine learning models from negatively affecting mobile devices through intermittent throttling.

BACKGROUND

Machine learning models made using artificial intelligence provide computing systems the ability to learn and improve with experience without additional programming. To advance technology, software developers have increased using machine learning models to provide more advanced or intelligent computing systems to their end users. Software developers design most machine learning models for execution by high-powered computing systems, such as desktop computers, with a sustained energy source (e.g., an electrical outlet) because the machine learning models may include complex algorithms and/or models that require substantial processing speed and/or memory.

End users have, however, increased their use of mobile devices that run mobile applications that impact their daily lives. In response, software developers have created mobile machine learning model frameworks to execute (e.g., run) machine learning models, including those frameworks designed to execute on desktop computers and on mobile devices. However, mobile devices are often not high-powered and have limited access to energy sources (e.g., a battery). Thus, the machine learning algorithms often negatively affect mobile devices before the machine learning models can complete their execution, that is, machine learning algorithms may cause mobile devices to overheat, overload the mobile device's memory or processors, or drain the mobile device's batteries.

Thus, there is a clear motivation to prevent machine learning models from negatively affecting mobile devices during operation. In view of these and other shortcomings and problems with machine learning models on mobile devices, improved systems and techniques are desirable.

SUMMARY

The disclosed embodiments address disadvantages of existing systems by providing novel systems, methods, and techniques for preventing machine learning models from negatively affecting mobile devices through intermittent throttling. The disclosed systems and methods may prevent the negative effects caused by legacy and/or current machine learning models that were designed to execute on desktop computers. The disclosed embodiments are unlike any prior implementations and provide multiple ways, as described below, to prevent machine learning models from negatively affecting mobile devices.

Certain disclosed embodiments provide a set of systems, devices, and methods. For example, a mobile device comprising a camera, one or more memory devices storing instructions, and one or more processors configured to execute instructions may be provided. The one or more processors may be configured to execute instructions to provide images captured by the camera to a machine learning model at a first rate. The one or more processors may also be configured to execute instructions to determine whether one or more of the images includes an object. If one or more of the images includes the object, the one or more processors may be configured to execute instructions to adjust the first rate of providing the images to the machine learning model to a second rate and determine whether to adjust the second rate of providing the images to the machine learning model to a third rate based on output received from the machine learning model.

Moreover, certain disclosed embodiments provide another set of systems, devices, and methods. For example, a mobile device comprising an input device for capturing inputs, one or more memory devices storing instructions, and one or more processors configured to execute instructions may be provided. The one or more processors may be configured to execute instructions to provide the inputs to a machine learning model at a first rate. The one or more processors may also be configured to execute instructions to determine whether one or more of the inputs includes an object. If one or more of the inputs includes the object, the one or more processors may be further configured to execute instructions to adjust the first rate of providing the inputs to the machine learning model to a second rate and determine whether to adjust the second rate of providing the inputs to the machine learning model to a third rate based on output received from the machine learning model.

Certain disclosed embodiments provide yet another set of systems, devices, and methods. For example, a system comprising one or more memory devices storing instructions and one or more processors configured to execute instructions may be provided. The one or more processors may be configured to execute instructions to capture a plurality of inputs. The one or more processors may also be configured to execute instructions to provide the inputs to a machine learning model at a first rate. In addition, the one or more processors may be configured to execute instructions to determine whether one or more of the inputs includes an object. If one or more of the inputs includes the object, the one or more processors may be further configured to execute instructions to adjust the first rate of providing the inputs to the machine learning model to a second rate and determine whether to adjust the second rate of providing the inputs to the machine learning model to a third rate based on output received from the machine learning model.

Further, certain disclosed embodiments provide a set of systems, devices, and methods. For example, disclosed embodiments include a mobile device comprising a camera for capturing images, an accelerometer for capturing gravitational force measurements, one or more memory devices storing instructions, and one or more processors configured to execute instructions. The one or more processors may be configured to execute instructions to determine whether the mobile device is still based on gravitational force measurements captured by the accelerometer. The one or more processors may also be configured to execute instructions to provide an image captured by the camera to a machine learning model if the mobile device is still.

Certain disclosed embodiments provide another set of systems, devices, and methods. For example, disclosed embodiments include a mobile device comprising an input device for capturing inputs, a sensor, the sensor capturing movement characteristic measurements, one or more memory devices storing instructions, and one or more processors configured to execute instructions. The one or more processors may be configured to execute instructions to determine whether the mobile device is still based on a movement characteristic measurement captured by the sensor. The one or more processors may also be configured to execute instructions to provide an input to a machine learning model if the mobile device is still.

Certain disclosed embodiments provide yet another set of systems, devices, and methods. For example, a system may comprise one or more memory devices storing instructions and one or more processors configured to execute instructions. The one or more processors may be configured to execute instructions to receive, via a camera of a mobile device, a plurality of images. The one or more processors may also be configured to execute instructions to receive, via an accelerometer of a mobile device, a plurality of gravitational force measurements. The one or more processors may further be configured to execute instructions to determine whether the mobile device is still based on at least one gravitational force measurement. In addition, the one or more processors may be configured to execute instructions to provide an input to a machine learning model if the mobile device is still.

Aspects of the disclosed embodiments may also include a method or a non-transitory tangible computer-readable medium that stores software instructions that, when executed by one or more processors, are configured for and capable of performing and executing one or more of the instructions, methods, operations, and the like, consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute apart of this specification, illustrate disclosed embodiments and, together with the description, serve to explain the disclosed embodiments. In the drawings.

DETAILED DESCRIPTION

The disclosed embodiments are directed to systems and methods for preventing machine learning models from negatively affecting mobile devices through intermittent throttling. Machine learning models may "negatively affect mobile devices" by causing a mobile device to overheat, contributing to battery life draining at a faster rate than normal, overloading its memory and/or processors, or the like. Embodiments of the present disclosure may be used to reduce these negative effects and others that the execution of machine learning models may cause to mobile devices.

As used herein the term "still" as relating to the device being still should be construed to include situations where the device is held to be still, positioned to be still, etc. In some embodiments, a device being still may include situations where there is slight movements, shaking, vibrating, etc. A device being still may include situations where the camera of the device has the ability to focus although movement may be occurring.

The following detailed description refers to the accompanying drawings.

While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims. Reference will now be made in detail to the disclosed embodiments, examples of which are illustrated in the accompanying drawings. Wherever convenient, the same reference numbers will be used throughout the drawings to refer to the same or like parts.

Figure 1:
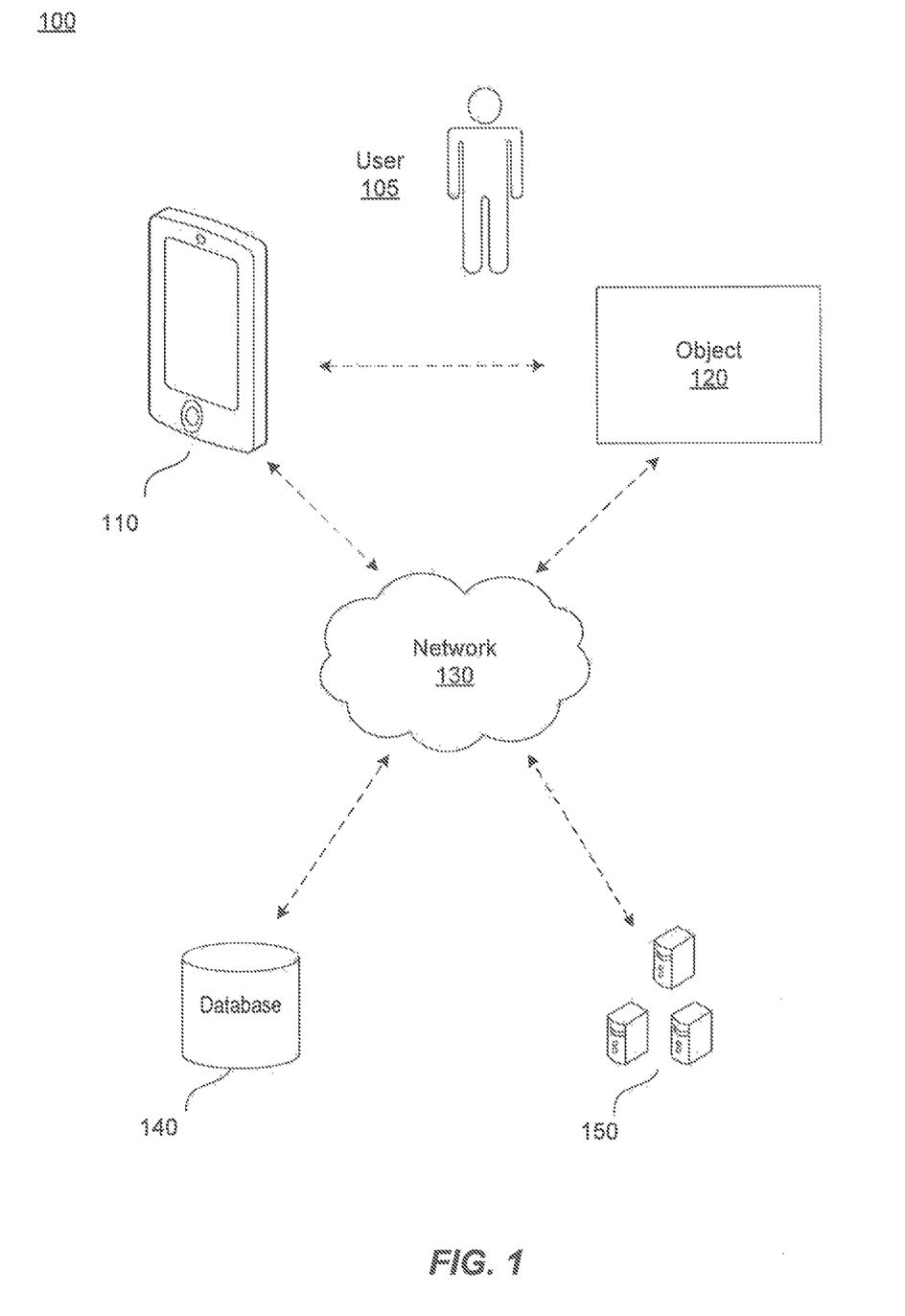
FIG. 1 is a block diagram of an exemplary system environment preventing machine learning models from negatively affecting mobile devices through intermittent throttling, consistent with disclosed embodiments.

FIG. 1 is a block diagram of an exemplary system environment 100 for preventing machine learning models from negatively affecting mobile devices through intermittent throttling. The components and arrangements shown in FIG. 1 are not intended to limit the disclosed embodiments, as the components used to implement the disclosed processes and features may vary.

In accordance with disclosed embodiments, system 100 may include mobile device 110 (which may be operated by user 105), object 120, network 130, database(s) 140, and server(s) 150. Other components known to one of ordinary skill in the art may be included in system 100 to gather, process, transmit, receive, and provide information used in conjunction with the disclosed embodiments.

Mobile device 110 may comprise a memory, a processor, and/or other specialized hardware that is configured to execute one or more methods of the disclosed embodiments. Mobile device 110 may be a smartphone, a virtual reality headset, a smartwatch, a pair of smart glasses, a tracking device, or any other suitable mobile device with computing capability. In some embodiments, mobile device 110 may have less computing power (e.g., in terms of processing speed, memory, number of processing cores, or the like) than a standard desktop computer.

Mobile device 110 may have an application installed thereon, which may receive, process, store, and/or provide information. The application may include and/or execute one or more machine learning models. Mobile device 110 may also transmit and receive data to/from server 140, and/or server cluster(s) 150 via network 130. The data may include one or more applications. User 105 may operate mobile device 110 to perform one or more operations consistent with disclosed embodiments. In some embodiments, user 105 may operate mobile device 110 to run applications that execute machine learning models to identify and process objects, such as object 120. For example, the machine learning models may identify the type of object 120 (e.g., machine learning model application 272 may be able to identify that an automobile is a Honda Civic™, Toyota Corolla™, or any other type of car, or able to identify that an automobile is a sedan, coupe, or SUV). However, it should be understood that the objective of a machine learning model and/or application is not limited by this present disclosure.

Additionally or alternatively, user 105 may operate mobile device 110 to run applications that execute machine learning models that persons of ordinary skill in the art have designed to operate on a desktop computer (not pictured) or a computer with more computing power than a mobile device. Here, the desktop computer may include a computer that has more processing power than mobile device 110. Persons of ordinary skill in the art may configure these applications to run on mobile device 110 using open source or commercial mobile machine learning model frameworks, such as Core ML™, TensorFlow™, and/or the like. In other words, in some embodiments, mobile machine learning model frameworks may permit machine learning models to runon mobile device 110. An exemplary computing device consistent with mobile device 110 is discussed in additional detail with respect to FIG. 2.

Network 130 may comprise any computer networking arrangement used to exchange data. For example, Network 130 may be the Internet, a private data network, a virtual private network (VPN) using a public network, and/or other suitable connections that enable the components of FIG. 1 to send and acquire information. Network 130 may also include a public switched telephone network ("PSTN") and/or a wireless network such as a cellular network, wireless network protocols based on the IEEE 802.11 (i.e., WI-FI), and/or another known wireless network (e.g., WiMAX (Worldwide Interoperability for Microwave Access)) capable of bidirectional data transmission. Network 130 may also be a wide area network (i.e., a WAN).

Network 130 may also include one or more local networks (not pictured). A local network may be used to connect the components of FIG. 1 to network 130. A local network may comprise any type of computer networking arrangement used to exchange data in a localized area, such as WI-FI based on IEEE 802.11 standards, Bluetooth™' Ethernet, and other suitable network protocols that enable components of system environment 100 to interact with one another and to connect to network 130 for interacting with components of FIG. 1. In some embodiments, a local network comprises a portion of network 130. In other embodiments, components of system environment 100 may communicate via network 130 without a separate local network.

Database 140 may include one or more memory devices that store information. By way of example, database 140 may include Oracle™ databases, Sybase™ databases, or other relational databases or non-relational databases, such as Apache™ HADOOP® sequence files, HBase™, or Cassandra™. The databases or other files may include, for example, data and information related to the source and destination of a network request, the data contained in the request, etc. Systems and methods of disclosed embodiments, however, are not limited to separate databases. Database 140 may include computing components (e.g., database management system, database server, etc.) configured to acquire and process requests for data stored in memory devices of database 140 and to provide data from database 140.

Server 150 may be located in a single location (e.g., a data center) or different physical locations. Multiple servers 150 may be formed as a grid to share resources and workloads. Each server 150 may include a plurality of linked nodes operating collaboratively to run various applications, software modules, analytical modules, rule engines, etc. Each node may be implemented using a variety of different equipment, such as a supercomputer, personal computer, a server, a mainframe, a mobile device, or the like. In some embodiments, the number of servers and/or server 150 may be expanded or reduced based on workload. In some embodiments, one or more components of FIG. 1 (including one or more server 150) may be placed behind a load balancer to support high availability and ensure real-time (or near real-time) processing of optimal decision predictions.

Server cluster(s) 150 may also include one or more cloud service(s) (not pictured). Cloud service may include a physical and/or virtual storage system associated with cloud storage for storing data and providing access to data via a public network such as the Internet. As used herein, cloud service refers to physical and virtual infrastructure associated with a single cloud storage service and may manage and/or store data associated with managing tip recommendations. Cloud service may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 130. In some embodiments, cloud service comprises multiple computer systems spanning multiple locations and having multiple databases or multiple geographic locations associated with a single or multiple cloud storage service(s).

Figure 2:
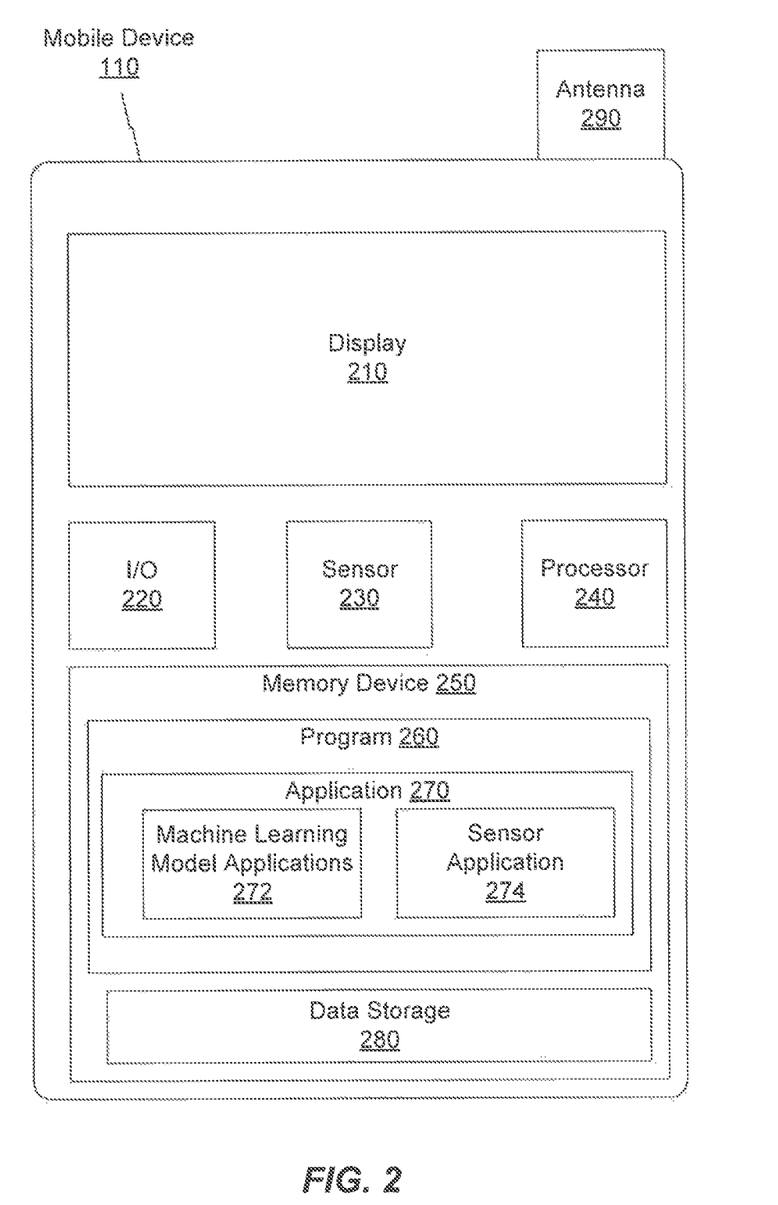
FIG. 2 is a block diagram of an exemplary mobile device configured to perform functions of the disclosed methods, consistent with disclosed embodiments.

FIG. 2 is a block diagram of an exemplary mobile device 110 configured to perform functions of the disclosed methods, consistent with disclosed embodiments. As shown, mobile device 110 may include one or more displays 210, input/output ("I/O") devices 220, sensors 230, processors 240, memory devices 250 having stored thereon one or more programs 260, such as one or more applications 270 (e.g., machine learning model application(s) 272 and/or sensor application(s) 274), and data storage 280. Mobile device 110 may also include antenna 290. One or more of display 210, I/O devices 220, sensors 230, processors 240, memory devices 250, and/or antenna 270, may be communicatively coupled to one or more of the other devices depicted in FIG. 2. Such a connection may be accomplished using a bus or other interconnecting device.

I/O device 220 may include a device that enables mobile device 110 to receive input and provide feedback. In some embodiments, I/O device 220 may enable mobile device 110 to receive input from user 105 and provide feedback to user 105. I/O device 220 may include, for example, one or more cameras, buttons, switches, speakers, microphones, recording devices, and/or touchscreen panels. In some embodiments, one or more applications 270, such as one or more machine learning model applications 272, may manipulate I/O device 220 to input information into mobile device 110 and/or perform one or more operations consistent with disclosed embodiments. Additionally or alternatively, user 105 may manipulate I/O device 220 to input information into mobile device 110 and/or perform one or more operations consistent with disclosed embodiments.

Sensor 230 may include one or more devices capable of sensing the environment around mobile device 110, movement of mobile device 110, and/or the conditions of mobile device 110, such as the battery life of mobile device 110, processor speed of mobile device 110, a measurement of a movement characteristic of mobile device 110, etc. A movement characteristic measurement of mobile device 110 may include a measurement of gravitational force on mobile device 110, a speed of mobile device 110, an acceleration of mobile device 110, a rotational speed of mobile device 110, a rotational acceleration of mobile device 110, a displacement of mobile device 110, or the like. Sensor 230 may include, for example, an accelerometer, a shock sensor, a gyroscope, a position sensor, a microphone, an ambient light sensor, a temperature sensor, a vibration sensor, a proximity sensor, a conductivity sensor, a global positioning system (GPS) sensor, or the like. One of ordinary skill in the art would understand that other types of sensors 230 could be included in mobile device 110. One of ordinary skill in the art would also understand what types of movement characteristics can be measured by one or more sensors 230.

Sensor 230 may include one or more devices capable of transmitting patterns in particular mediums. That is, sensor 230 may comprise one or more elements capable of transmitting a pattern using one or more mediums of light, sound, thermal energy, vibrations, pulses of air, or the like. For example, sensor 230 may include one or more light emitting elements capable of transmitting blinking, different colored lights, etc. Sensor 230 may also include thermoelectric devices, fans capable of producing pulses of air, motors capable of producing vibrations, speakers, etc.

Processor 240 may be one or more known processing devices, such as a microprocessor from the Pentium™ or Atom™ families manufactured by Intel™, the Turion™ family manufactured by AMD™, the Exynos™ family manufactured by Samsung™ or the Snapdragon™ family manufactured by Qualcomm™. Processor 240 may constitute a single core or multiple core processor that executes parallel processes simultaneously. For example, processor 240 may be a single core processor configured with virtual processing technologies. In certain embodiments, processor 240 may use logical processors to execute and control multiple processes simultaneously.

Processor 240 may implement virtual machine technologies, or other known technologies, to provide the ability to execute, control, run, manipulate, store, etc., multiple software processes, applications, programs, etc. In another embodiment, processor 240 may include a multiple-core processor arrangement (e.g., dual, quad-core, etc.) configured to provide parallel processing functionalities to allow mobile device 110 to execute multiple processes simultaneously. One of ordinary skill in the art would understand that other types of processor arrangements could be implemented that provide for the capabilities disclosed herein.

Memory 250 may be a volatile or non-volatile, magnetic, semiconductor, tape, optical, removable, non-removable, or another type of storage device or tangible (i.e., non-transitory) computer-readable medium that stores one or more program(s) 260 such as application 270, and data storage 280. Data storage 280 may store, for example, user 105's personal information, account information, displays, settings, one or more pairing configurations, one or more logs, and preferences. In some embodiments, data storage 280 may store data relating to one or more applications 270.

Program(s) 260 may include operating systems (not shown) that perform known operating system functions when executed by one or more processors. By way of example, the operating systems may include Microsoft Windows™, Unix™, Linux™, Apple™, or Android™ operating systems (not pictured), Personal Digital Assistant (PDA) type operating systems, such as Microsoft CE™, or other types of operating systems. Accordingly, disclosed embodiments may operate and function with computer systems running any type of operating system. Mobile device 110 may also include communication software that, when executed by a processor, enables communications with network 130, such as a Web browser software, tablet, or smart device networking software, etc. Mobile device 110 may also execute mobile applications for performing operations consistent with disclosed embodiments. In addition, program(s) 260 may include application(s) 270, such as an application for, activating, setting up, and configuring mobile device 110. In some embodiments, applications 270 may include machine learning model application(s) 272 and/or sensor application(s) 274.

Machine learning model application 272 may include one or more applications that incorporate machine learning models to complete one or more operations. In some embodiments, machine learning model application 272 may utilize one or more of sensor application 274, sensor 230, and/or I/O devices 220. For example, machine learning model application 272 may utilize I/O device 220, such as a camera, to capture and process images in real-time using machine learning models. In some embodiments, machine learning model application 272 may identify and process objects, such as object 120. For instance, machine learning model application 272 may identify that an automobile is a Honda Civic™, Toyota Corolla™, or any other type of car. However, it should be understood that machine learning model application 272 is not limited by this present disclosure.

Machine learning model application 272 may have been designed by one of ordinary skill in the art to operate on a desktop computer. As stated above, a desktop computer may include a computer that has more processing power than mobile device 110. Persons of ordinary skill in the art may configure machine learning model application 272 to run on mobile device 110 using open source or commercial frameworks, such as Core ML™, TensorFlow™, and or the like.

Sensor application 274 may include one or more applications that monitor one or more sensors 230. For example, sensor application 274 may monitor sensor 230, such as a battery life sensor and/or a battery, and communicate status indicators of the particular sensor 230 (e.g., a percentage of available battery life, a remaining time of available battery life, a rate of battery life depletion, etc.). As another example, sensor application 274 may monitor sensor 230, may communicate status information of other sensors, such status indicators, may include processor speed, processor usage, processor usage over time, memory usage, memory usage over time, etc.

Figure 3:
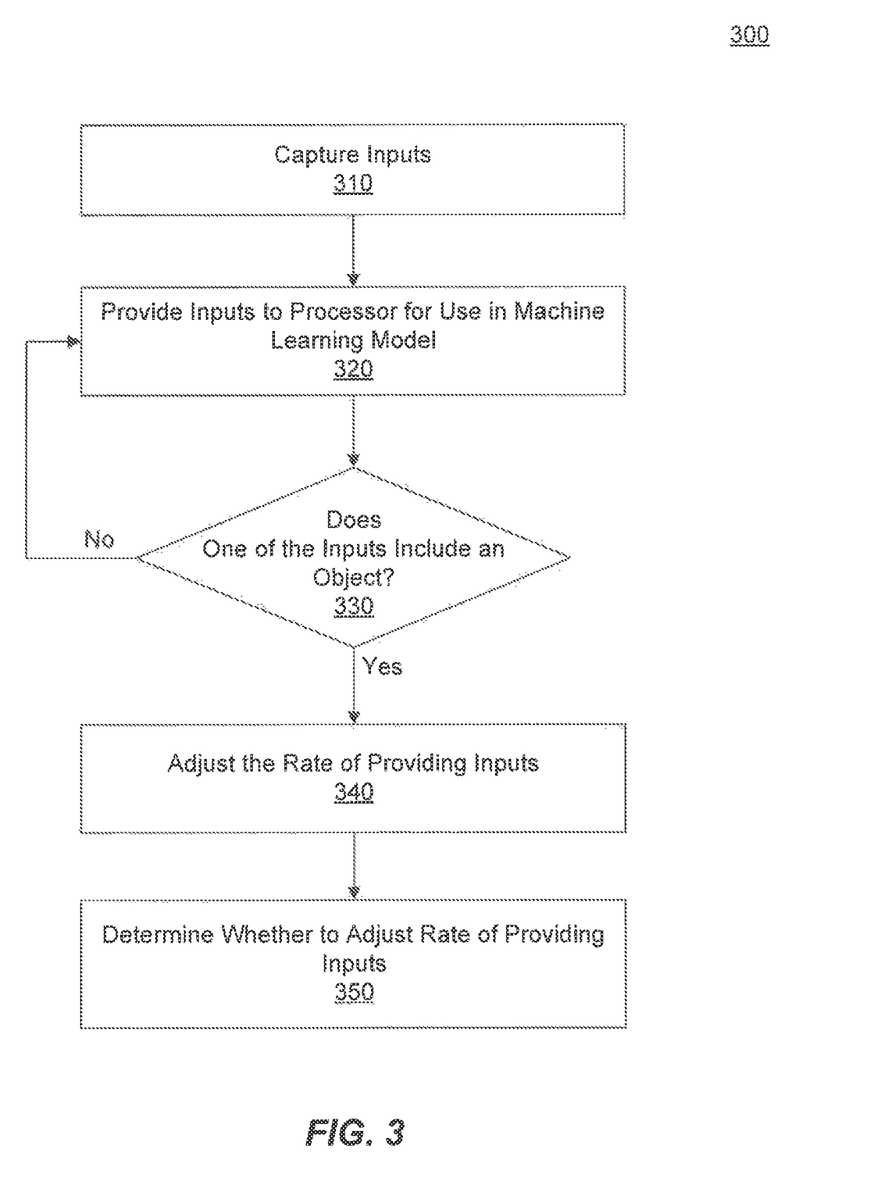
FIG. 3 is a flowchart of an exemplary process preventing machine learning models from negatively affecting mobile devices through intermittent throttling, consistent with disclosed embodiments.

FIG. 3 is a flowchart of an exemplary process 300 preventing machine learning models from negatively affecting mobile devices through intermittent throttling. Mobile device 110 may use one or more applications including machine learning model applications 272, sensor application 274, and/or other applications (not depicted) to complete the steps of process 300. Process 300 may prevent, for example, overheating and battery drain of mobile device 110 while the mobile device 110 processes inputs (e.g., images, text, etc.) from input devices 220 (e.g., cameras, keyboards, etc.) using a machine learning model application 272.

At step 310, mobile device 110 may capture one or more inputs via one or more input devices 220. For example, in some embodiments, mobile device 110 may capture images via a camera (e.g., an input device 220). Mobile device 110 may, additionally or alternatively, also capture text, sounds, etc. via input devices 220, such as keyboards, recording devices, etc. Mobile device 110 may capture the inputs at a rate, such as frames per second.

At step 320, mobile device 110 may provide one or more of the captured inputs into a machine learning model via machine learning model application 272. Mobile device 110 may provide one or more of the captured inputs into a machine learning model, via machine learning model application 272, by providing the captured inputs to processor 240 for use in the machine learning model.

In some embodiments, mobile device 110 may provide a first input of the inputs to the machine learning model while capturing a second input of the inputs at step 310. In certain embodiments, mobile device 110 may capture a set of the inputs at step 310 before providing the inputs to the machine learning model via machine learning model application 272. Mobile device 110 may provide one or more of the captured inputs into the machine learning model at a certain rate.

After providing one or more inputs to the machine learning model, at step 330, mobile device 110 may determine whether at least one of the captured images includes an object. In some embodiments, step 330 may occur before mobile device 110 begins providing one or more of the captured inputs into a machine learning model (in step 320). In other embodiments, step 330 may occur after or during step 320.

To determine whether an image includes an object, mobile device 110 may determine whether the image includes an object based on the output from the machine learning model or using some other technique. For example, mobile device 110 may determine that the image includes an object based on determining that the object is depicted in the scene. To be depicted in the scene, mobile device 110 may determine that the whole or a part of the object is depicted in the scene. For example, mobile device 110 and/or machine learning model application 272 may retrieve the general outline for an object from database 140 and/or server 150. Mobile device 110 and/or the machine learning model may then determine whether a part or the entire outline for the object is depicted in the image by comparing one or more outlines in the image to determine that the object is depicted in the image.

Using the general outline of the image as a comparison technique to see if the object is depicted in the image is only exemplary. In some embodiments, mobile device 110 and/or machine learning model application 272 may determine that the image includes an object based on retrieving one or more colors, shapes, dimensions, shadows, or other properties of the object or the image of the object in addition or alternative to using the general outline of the image. In certain embodiments, mobile device 110 and/or machine learning model application 272 may determine that the image includes an object based on determining that an object is depicted in the center of the image.

Machine learning model application 272 may also use historical images and/or determinations of objects to determine whether the object is depicted in the image. The machine learning model application 272 may be trained to determine whether the object is depicted in the image using supervisory, semi-supervisory, or non-supervisory techniques. The mobile device 110 and/or machine learning model application 272 may also determine or be configured to detect certain objects. For example, mobile device 110 and/or machine learning model application 272 may determine or be configured to detect, e.g., cars rather than houses, money rather than food, etc.

Figure 4:
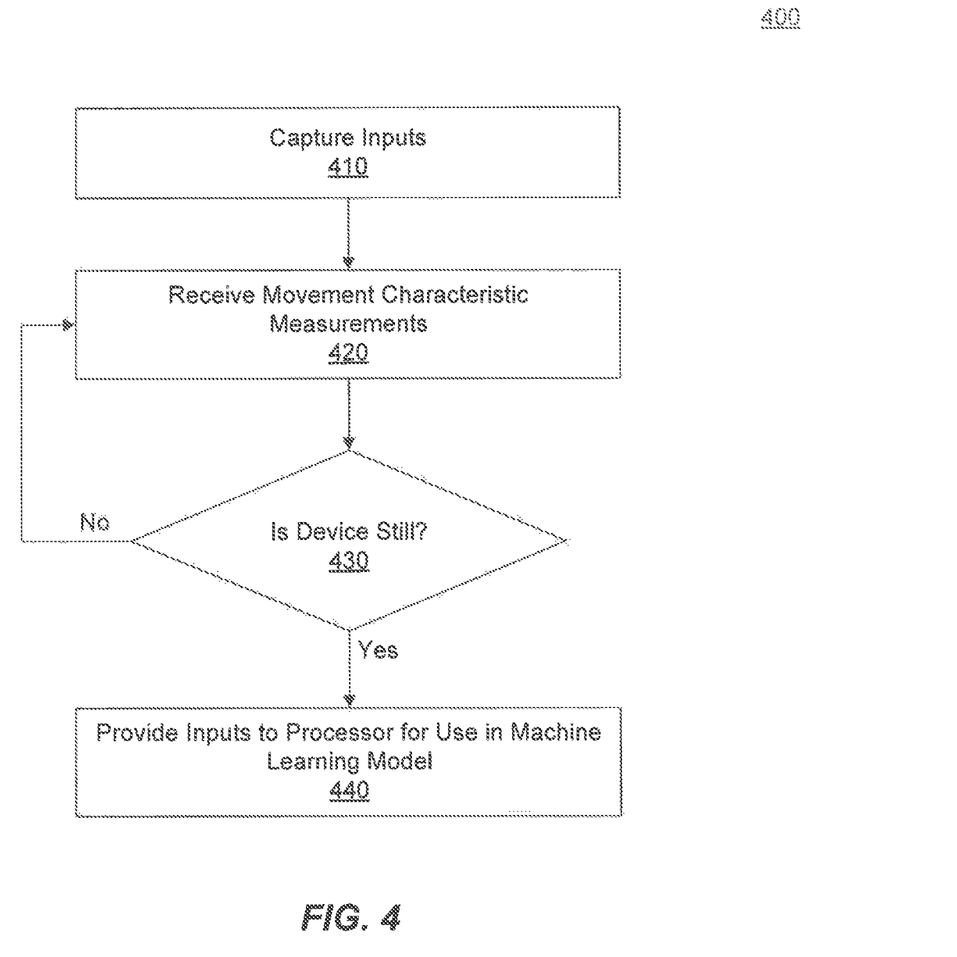
FIG. 4 is a flowchart of an exemplary process preventing machine learning models from negatively affecting mobile devices through intermittent throttling, consistent with disclosed embodiments.

If mobile device 110 does not determine that the image includes an object, mobile device 110 may continue one or more of the previous steps, such as capturing images (step 310), providing inputs into the machine learning model (step 320), and/or determining whether the inputs include an object (step 330). In some embodiments, mobile device 110 may stop processing the image and/or use other techniques, such as those discussed in relation to process 400 below.

If mobile device 110 does determine that the image includes an object, at step 340, mobile device 110 may adjust the rate of providing the inputs to the machine learning model. In some embodiments, mobile device 110 may adjust the rate of providing inputs to the machine learning model by increasing the rate. For example, mobile device 110 may adjust the rate of providing images at 50 images per second to 100 images per second. Mobile device 110 may increase the rate at this step because mobile device 110 may need to utilize more resources to identify the type of the object more efficiently. However, the reason why mobile device 110 may not have increased the rate before reaching this step because mobile device 110 may have inefficiently used its resources when there is no identifiable object, which potentially may cause the machine learning model application 272 to negatively affect mobile device 110 before a type of object is determined.

At step 350, mobile device 110 may adjust the rate based on one or more outputs received from the machine learning model. Output may include a confidence score and/or an object type. The confidence score may identify how confident the machine learning model is that the image includes an object that matches the object type. An output may, additionally or alternatively, correspond to an image, that is, the output may be generated by the machine learning algorithm as a result of mobile device 110 providing an image to the machine learning algorithm. Thus, as the machine learning model is more confident that an object in the image matches a certain object type, mobile device 110 may increase the rate of providing the inputs to the machine learning model to identify the type of the object more efficiently. However, as the machine learning model is more confident that an object in the image matches a certain object type, mobile device 110 may decrease the rate of providing the inputs to the machine learning model, for example, to preserve resources and prevent negative events. For example, mobile device 110 may increase the rate if mobile device 110 determines that the confidence score exceeds a confidence threshold value (e.g., 90%, 85%, 80%, etc., confidence) and/or decrease the rate if mobile device 110 determines that the confidence score is below a second confidence threshold value (e.g., 10%, 20%, 30%, etc., confidence) or does not exceed the confidence threshold value (e.g., 90%, 85%, 80%, etc., confidence).

In some embodiments, machine learning model application 272 may output some values that are inconsistent with other values. Thus, in certain embodiments, mobile device 110 may compare an aggregate confidence score of two or more confidence scores of the outputs to the confidence threshold value. Mobile device 110 may calculate the aggregated confidence score (e.g., weighted average confidence score) based on a weighted average of object types and confidence scores. For example, each confidence score may be weighted by a factor according to its identified object type. Mobile device 110 may increase the rate if mobile device 110 determines that the aggregated confidence score exceeds a confidence threshold value (e.g., 90%, 85%, 80%, etc., confidence) and/or decrease the rate if mobile device 110 determines that the aggregated confidence score is below a second confidence threshold value (e.g., 10%, 20%, 30%, etc., confidence) or does not exceed the confidence threshold value (e.g., 90%, 85%, 80%, etc., confidence).

Mobile device 110 may adjust the confidence threshold value via a sensor and/or sensor application 274. For example, mobile device 110 may increase the confidence threshold value (e.g., 90%, 85%, 80%, etc., confidence) if the available battery life of the mobile device is below a certain predetermined level. For instance, mobile device 110 may increase the confidence threshold value from 80% to 90% to preserve resources and by making it less likely for mobile device 110 to increase the rate in step 350. Mobile device 110 may decrease the confidence threshold value from 80% to 70% to increase the efficiency of mobile device 110 and the machine learning model by making it more likely for mobile device 110 to increase the rate in step 350. Other sensors and/or sensor applications, as described above, may also be used in real-time to adjust the confidence threshold value and, thus, balancing the efficiency of mobile device 110 to, for example, use a machine learning model to identify the type of object in the captured images with the potentially negative effects of the machine learning models on mobile device 110. Mobile device 110 may increase or decrease the second confidence threshold value to obtain the same results.

FIG. 4 is a flowchart of an exemplary process 400 preventing machine learning models from negatively affecting mobile device 110 through intermittent throttling. Mobile device 110 may use one or more applications, including machine learning model applications 272, sensor application 274, and/or other applications (not depicted), to complete the steps of process 400. Process 400 may prevent, for example, overheating and battery drain of mobile device 110 while the mobile device 110 processes inputs (e.g., images, text, etc.) from input devices 220 (e.g., cameras, keyboards, etc.) using a machine learning model application 272.

At step 410, mobile device 110 may capture one or more inputs using techniques similar to those described above in relation to step 310. At step 420, mobile device 110 may capture one or more movement characteristic measurements. A movement characteristic measurement of mobile device 110 may include, for example, a measurement of gravitational force on mobile device 110, a speed of mobile device 110, an acceleration of mobile device 110, a rotational speed of mobile device 110, a rotational acceleration of mobile device 110, a displacement of mobile device 110, or the like. In some embodiments, mobile device 110 may capture, via one or more sensor applications 274 and/or sensors 230, one or more movement characteristic measurements. For example, mobile device 110 may use accelerometer (e.g., sensor) 230 to capture one or more gravitational measurements. Mobile device 110 may, additionally or alternatively, capture other characteristic measurements as described above in relation to FIG. 2.

At step 430, mobile device 110 may determine whether mobile device 110 is still based on one or more movement characteristic measurements. Alternatively, mobile device 110 may determine whether mobile device 110 is moving at a certain speed, rotating, etc. In some embodiments, mobile device 110 may determine that the mobile device is still if the movement characteristic measurement does not exceed a movement threshold value or determine that the mobile device is not still if the movement characteristic exceeds a movement threshold value. Thus, in some embodiments, mobile device 110 may determine whether mobile device 110 is still based on whether the movement characteristic measurement is nonexistent, that is, the movement characteristic may indicate that mobile device 110 has little to no movement.

In some embodiments, mobile device 110 may use an average movement characteristic measurement which may be compared to the movement threshold value in order to determine whether mobile device 110 is still. Mobile device 110 may determine that the mobile device is still if the movement characteristic measurement does not exceed the movement threshold value or determine that the mobile device is not still if the movement characteristic exceeds the movement threshold value.

Mobile device 110 may determine the movement threshold value based on the historical movement characteristic measurements captured by sensor 230 and/or sensor application 274. In some embodiments, mobile device 110 may base the movement threshold value on a movement characteristic range. The movement characteristic range may be based on the historical movement characteristic measurements. For example, mobile device 110 may determine, using historical movement characteristics for user 105 of mobile device 110 and/or other users of other mobile devices, a gravitational force range between 0.1 N to 0.5 N. Mobile device 110 may then determine the movement threshold value based on the range, such as the average of the range, the median of the range, the lower median of the range, etc.

Mobile device 110 may determine the movement threshold value based on the range to determine when the mobile device 110 is still for a particular user (e.g., user 105) and/or when the mobile device 110 is still for an average user or a range of users. Mobile device 110 may determine the average user or range of users based on users who use the same type of mobile device as mobile device 110, etc. The same type of mobile device 110 may include the mobile device of the same manufacturer, the same make, the same model, the same release date, the same mobile category (e.g., touchscreen phones, flip-phones, keyboard phones, etc.), the same size, the same processor speed, the same memory, any combination thereof, and/or the like.

As with the confidence threshold value discussed in 350, mobile device 110 may adjust the movement threshold value, discussed here, according to sensor 230 (e.g., battery life) and/or sensor application 274. For example, mobile device 110 increases the movement threshold value if the available battery life of mobile device 110 is below a certain level to make it harder for mobile device 110 to determine that it is still in order to prevent negative effects. Additionally or alternatively, mobile device 110 may decrease the movement threshold value if an available battery life is above a certain level to make it easier for mobile device 110 to determine that it is still to increase efficiency of mobile device 110 and/or machine learning model to determine, for example, the type of an object. In some embodiments, mobile device 110 may deactivate the input device if the available battery life is below a certain level to reduce strain on mobile device 110.

If mobile device 110 determines that mobile device 110 is still, mobile device 110 may provide the inputs to the machine learning model (step 440). In some embodiments, mobile device 110 may continue to check and/or determine whether mobile device 110 is still. In some embodiments, mobile device 110 may discontinue providing inputs to the machine learning model if mobile device 110 determines that the movement characteristic measurement exceeds a movement threshold value, that is, mobile device 110 may determine that mobile device 110 has moved or not become still enough to provide inputs to the machine learning model.

Mobile device 110 may combine one or more steps of FIG. 3 and FIG. 4 to prevent and/or reduce negative effects, for example, overheating, depletion of battery life, etc. Mobile device 110, for example, may perform step 330 of FIG. 3 (determining whether the inputs include an object) before performing step 430 (determining whether the device is still) to complete process 400. Mobile device 110 may also include steps of process 400 to complete steps of process 300. In some embodiments, mobile device 110 may determine, while completing steps of process 300, to instead complete process 400, and/or vice versa. Additional and/or alternative steps may also be added to process 300 and/or process 400. Steps may also be deleted from process 300 and/or process 400.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., aspects across various embodiments), adaptations, or alterations based on the present disclosure. The elements in the claims are to be interpreted broadly based on the language employed in the claims and not limited to examples described in the present specification or during the prosecution of the application, of which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A method for preventing machine learning models from negatively affecting mobile devices through intermittent throttling, comprising:
   receiving one or more movement characteristic measurements from a sensor included in a mobile device;
   determining a stillness of the mobile device based on the received one or more movement characteristic measurements;
   capturing at least one image with a camera;
   determining, using a first machine learning model, whether the at least one image includes an object by retrieving, from a database, at least one property of the object, and comparing at least one property of the at least one image with the at least one property of the object;
   providing the at least one image captured by the camera to the first machine learning model or a second machine learning model at a rate determined based on the determined stillness of the mobile device, wherein more images captured by the camera are provided to the first machine learning model or the second machine learning model if the one or more movement characteristic measurements are below a movement threshold level; and
   adjusting the rate at a first time based on a determination that the at least one image includes a first category of object type and not a second category of object type, and adjusting the rate at a second time based on an output from the first machine learning model or the second machine learning model, the output including an identified type of the object within the first category and a confidence score indicating a probability that the object matches the identified type of the object.

2. The method of claim 1, wherein the one or more movement characteristic measurements include at least one of a measurement of gravitational force on the mobile device, a measurement speed of the mobile device, a speed of the mobile device, an acceleration of the mobile device, a rotational speed of the mobile device, a rotational acceleration of the mobile device, or a displacement of the mobile device.

3. The method of claim 1, wherein the first or the second machine learning model further uses historical data associated with objects for determining whether the at least one image includes the object.

4. The method of claim 1, further comprising determining a movement threshold based on averaging historical movement characteristic measurements of the mobile device.

5. The method of claim 4, wherein determining a stillness of the mobile device further comprises determining that the one or more movement characteristic measurements exceed the movement threshold.

6. The method of claim 4, wherein determining a stillness of the mobile device further comprises determining that an average movement characteristic measurement exceeds the movement threshold.

7. The method of claim 4, wherein determining the movement threshold further comprises:
   identifying a movement characteristic measurements range based on historical movement characteristic measurements; and
   identifying a movement threshold based on the movement characteristic measurements range.

8. The method of claim 4, further comprising adjusting the movement threshold based on at least one of the sensor or a sensor application running on the mobile device.

9. The method of claim 8, wherein adjusting the movement threshold further comprises increasing the movement threshold when an available battery life of the mobile device is below a certain level.

10. The method of claim 8, wherein adjusting the movement threshold further comprises decreasing the movement threshold when an available battery life of the mobile device is above a certain level.

11. The method of claim 1, further comprising:
    increasing the determined rate if the confidence score exceeds a confidence threshold.

12. The method of claim 1, further comprising:
    receiving an additional movement characteristic measurement from the sensor after providing the at least one image to the first machine learning model or the second machine learning model; and
    determining a stillness of the mobile device based on the additional movement characteristic measurement.

13. The method of claim 1, further comprising:
adjusting, based on the determined stillness of the mobile device, the determined rate to a second rate if the at least one image includes the object.

14. The method of claim 13, further comprising determining whether to adjust the second rate to a third rate based on the confidence score received from the first machine learning model or the second machine learning model.

15. The method of claim 13, wherein the second rate is greater than the determined rate.

16. The method of claim 1, wherein determining whether the at least one image includes an object further comprises determining that the at least one image includes an object based on determining whether the object is depicted in a particular section of the at least one image.

17. The method of claim 1, wherein adjusting the rate further comprises deactivating an input device based on the output.

18. The method of claim 1, wherein the first machine learning model or the second machine learning model is configured to run on the mobile device using a mobile machine learning model framework.

19. A method for preventing machine learning models from negatively affecting mobile devices through intermittent throttling, comprising:
receiving one or more gravitational force measurements from an accelerometer included in a mobile device;
determining a stillness of the mobile device based on the received gravitational force measurements;
capturing at least one image with a camera;
determining, using a first machine learning model, whether the at least one image includes an object by retrieving, from a database, at least one property of the object, and comparing at least one property of the at least one image with the at least one property of the object;
providing the at least one image captured by the camera to the first machine learning model or a second machine learning model at a rate determined based on the determined stillness of the mobile device, wherein more images captured by the camera are provided to the first machine learning model or the second machine learning model if the gravitational force measurements are below a movement threshold level; and
adjusting the rate at a first time based on a determination that the at least one image includes a first category of object type and not a second category of object type, and adjusting the rate at a second time based on an output from the first machine learning model or the second machine learning model, the output including an identified type of the object within the first category and a confidence score indicating a probability that the object matches the identified type of the object.

20. A non-transitory computer-readable medium storing instructions to execute a method by a processor to prevent machine learning models from negatively affecting mobile devices through intermittent throttling, the method comprising:
receiving one or more movement characteristic measurements from a sensor included in a mobile device;
determining a stillness of the mobile device based on the received one or more movement characteristic measurements;
capturing at least one image with a camera;
determining, using a first machine learning model, whether the at least one image includes an object by retrieving, from a database, at least one property of the object, and comparing at least one property of the at least one image with the at least one property of the object;
providing the at least one image captured by the camera to the first machine learning model or a second machine learning model at a rate determined based on the determined stillness of the mobile device, wherein more images captured by the camera are provided to the first machine learning model or the second machine learning model if the one or more movement characteristic measurements are below a movement threshold level; and
adjusting the rate at a first time based on a determination that the at least one image includes a first category of object type and not a second category of object type, and adjusting the rate at a second time based on an output from the first machine learning model or the second machine learning model, the output including an identified type of the object within the first category and a confidence score indicating a probability that the object matches the identified type of the object.

* * * * *